March 31, 1953     J. A. MUSIAL     2,633,319
TRIPOD
Filed Sept. 16, 1949
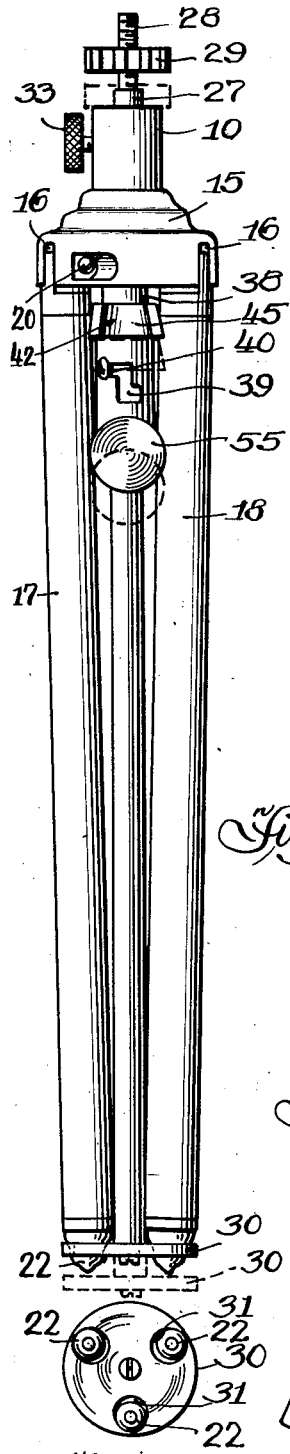
Fig. 1
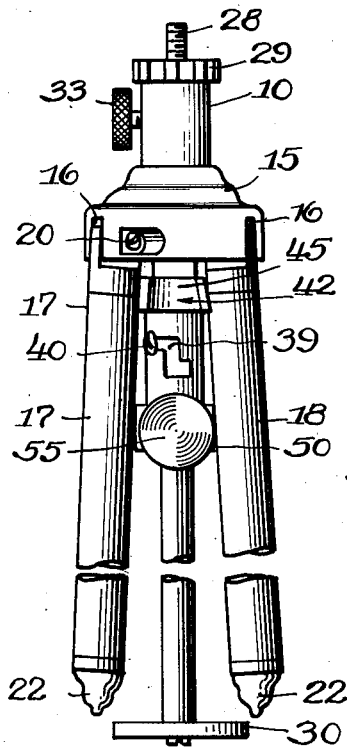
Fig. 3
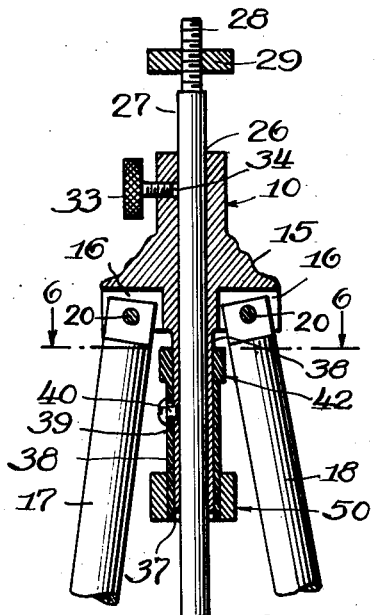
Fig. 4
Fig. 2
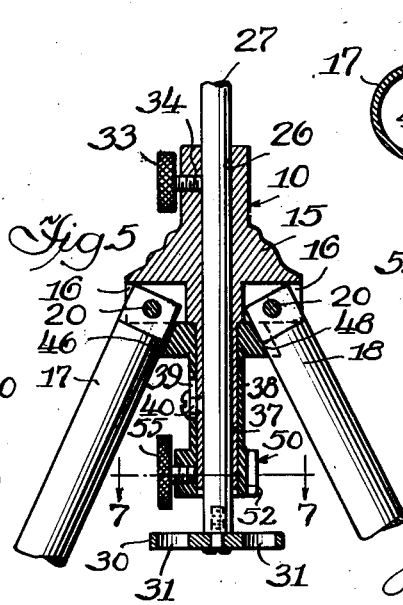
Fig. 5
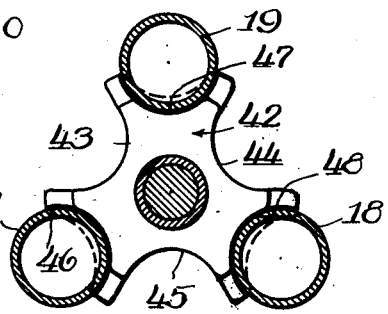
Fig. 6
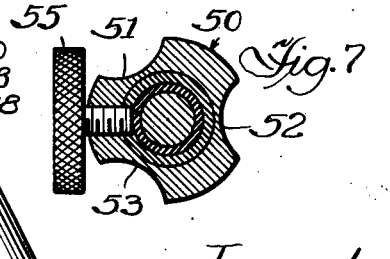
Fig. 7
Inventor,
John A. Musial,
Robert L. Kahn Atty.

Patented Mar. 31, 1953

2,633,319

UNITED STATES PATENT OFFICE 2,633,319

TRIPOD

John A. Musial, Chicago, Ill.

Application September 16, 1949, Serial No. 116,182

1 Claim. (Cl. 248—168)

This invention relates to a tripod and is particularly concerned with a tripod for cameras and other instruments and devices which must be supported in various positions in use.

The invention provides a construction wherein the tripod legs when opened for use cannot be collapsed so that the tripod remains stable under all conditions of use. The invention furthermore provides a construction wherein when the tripod is collapsed the legs are maintained together and prevented from opening accidentally.

A structure embodying the present invention is characterized by simplicity and ease of manipulation. In order that the invention will be fully understood, it will now be explained in connection with the drawings wherein Figure 1 is an elevation of a tripod, embodying the present invention, in collapsed condition, certain portions of the tripod being shown in dotted position in readiness for opening the tripod. Figure 2 is a bottom plan view of the tripod shown in Figure 1. Figure 3 is an elevation generally similar to Figure 1 but showing the tripod parts in position for opening the legs. Figure 4 is a sectional elevation of the tripod shown in Figure 3. Figure 5 is a sectional elevation of the tripod with parts open in position for use. Figure 6 is a section on line 6—6 of Figure 4 and Figure 7 is a section on line 7—7 of Figure 5.

Tripod head 10 has base portion 15 provided with three slots 16 into which are pivotally secured tripod legs 17, 18 and 19 respectively. The tripod legs may be formed in any suitable fashion and the pivotal mounting at portion 15 in slot 16 may be formed in any desired fashion such as by using pivot bolts 20. Each of the tripod legs may be equipped with hardened tips 22 with suitable points for digging into a supporting surface. Inasmuch as the construction of the tripod leg is conventional, a further description thereof is not deemed to be important.

Tripod head 10 is provided with an axial channel 26 through which passes metal rod 27. Metal rod 27 carries bolt 28 and nut 29 for attachment to a panoramic head or to a camera or other device.

Head 10 is adapted to have mounted thereon any suitable device to be supported on a tripod, such device being a camera, for example. The camera may be screwed on to bolt 28 either directly or may be attached thereto by means of a panoramic head for giving universal motion in all directions. Inasmuch as such panoramic heads are well known, a detailed description thereof is unnecessary. In general, however, such a head provides for universal motion.

Rod 27 terminates in retainer disc 30 having apertures 31 adapted to align with tips 22 of the tripod legs. Thumb screw 33 cooperating with threaded aperture 34 in tripod head 10 is adapted to provide a locking action for rod 27 to maintain the same locked in any desired position. Rod 27 is preferably somewhat longer than the combined length of the tripod legs and tripod head as seen in Figures 1 to 4 inclusive so that some longitudinal movement of rod 27 is possible upon loosening of nut or thumb screw 33. Thus in the position shown in Figure 1, rod 27 is moved upwardly with respect to the tripod so that locking disc 30 engages the free ends of the tripod legs and maintains the tripod legs tightly clamped. When rod 27 is moved downwardly as shown in the dotted line position of Figure 1, the device assumes a position shown in Figure 3 with apertured disc 30 clearing the tripod legs. In this position, tripod legs 17 to 19 inclusive may be opened up and may function in a normal manner.

Tripod head 10 at the bottom thereof carries sleeve portion 37. Disposed around sleeve portion 37 is second sleeve 38. Sleeve 38 has generally Z-shaped slot 39 with which pin 40 carried by inner sleeve 37 is adapted to cooperate. Thus it will be clear that outer sleeve 38 may have some movement with respect to tripod head 10, this movement being limited by Z slot 39 and also being limited augularly by the same slot. The purpose of this will be apparent.

Outer sleeve 38 carries, preferably at the upper portion thereof, cam block 42 having three uniformly spaced deep recesses 43 to 45 inclusive and an additional series of shallow recesses 46 to 48 inclusive. Shallow recesses 46 to 48 inclusive and deep recesses 43 to 45 inclusive are arranged as shown so that one follows the other. Outer sleeve 38 at the bottom portion thereof carries a second cam block 50 having three recesses 51 to 53 inclusive, these generally registering with recesses 43 to 45 inclusive of the upper cam block. Lower cam block 50 also has thumb screw 55 disposed in a suitably threaded aperture therein, the thumb screw going into a portion of the cam block between adjacent recesses. Thumb screw 55 is adapted to provide a locking action between sleeves 38 and 37.

When it is desired to use the tripod, rod 27 is moved downwardly as shown in Figure 3 after thumb screw 33 has been loosened. Tripod legs 17 to 19 inclusive are then cleared of locking plate 30 and the tripod legs are swung outwardly. Thumb screw 55 is now loosened and with the tripod legs clearing the two cam blocks on outer sleeve 38, this sleeve 38 together with the two cam blocks is rotated from the position shown in Figure 3. In the position in Figure 3, the tripod legs may nest within cam slots 43 to 45 inclusive as well as slots 51 to 53 inclusive. However, when sleeve 38 is rotated, the Z slot 39 is just large enough so that in the other position of the sleeve, shallow cam slots 46 to 48 inclusive may register with the tripod legs. When this position of sleeve 38 has been reached, thumb screw 55 is tightened to lock this sleeve in position.

Tripod legs 17 to 19 inclusive are preferably mounted in such a manner that they may be spread out to a limited degree. Thus for example, as shown in Figure 5 the tops of the tripod legs do not have sufficient clearance within the head slots to permit the legs to open up more than say 30 or 45 degrees as the case may be. It is understood, of course, that the tripod legs can be opened up to an angle somewhat greater than necessary to clear the largest portions of the two cam blocks on sleeve 38. Rod 27 may then be elevated to any desired degree and thumb screw 33 tightened to any desired position. The tripod legs may be of conventional construction either with or without telescoping sections.

What is claimed is:

A tripod comprising a head having a longitudinal channel and three legs pivoted to said head, means for limiting the outward movement of said legs from a closed position, a rod slidably disposed in said channel and extending beyond said head in both directions, said rod being adapted to support a camera or other device at its upper end and having tripod leg retainers at the lower end, said legs when closed being locked by said rod being in its upper position and said retainers engaging the leg ends, means on said head for locking said rod to said head, a sleeve carried by said head at the lower part thereof, a recessed block carried by said sleeve, said block having two series of three recesses, one series having deep recesses and the other series having shallow recesses with deep and shallow recesses alternating, said sleeve in one position having the deep recesses registering with the legs in a closed position, said sleeve in another position having the shallow recesses registering with and supporting the legs in an open position, said legs being capable of opening wide enough to clear the recessed block when the same is turned, said head having a depending sleeve portion within said first named sleeve, said first named sleeve carrying a pin and said last named sleeve having a stepped Z slot so that said first named sleeve may be turned through a limited angle and moved vertically with respect to the head, said slot being sufficient to permit the first named sleeve to move angularly from one position to the other.

JOHN A. MUSIAL.

REFERENCES CITED

The following references are of record in the file of this patent:

UNITED STATES PATENTS

| Number | Name | Date |
| --- | --- | --- |
| 1,310,336 | Hanks | July 15, 1919 |
| 2,204,013 | Gaidos | June 11, 1940 |
| 2,297,927 | Whitman | Oct. 6, 1942 |

FOREIGN PATENTS

| Number | Country | Date |
| --- | --- | --- |
| 817,654 | France | May 31, 1937 |